United States Patent [19]

Standen et al.

[11] 3,862,080

[45] Jan. 21, 1975

[54] FOUNDRY BINDER COMPOSITIONS

[75] Inventors: Colin John Smeed Standen; William Sidney Phillips, both of Waltham Abbey, England

[73] Assignee: Catalin Limited, Essex, England

[22] Filed: June 28, 1972

[21] Appl. No.: 267,152

[30] Foreign Application Priority Data
June 29, 1971 Great Britain .................... 30507/71

[52] U.S. Cl........... 260/37 N, 164/43, 260/DIG. 40, 260/42.43
[51] Int. Cl............................................. C08g 51/04
[58] Field of Search............. 260/46, DIG. 40, 37 N; 164/43

[56] References Cited
UNITED STATES PATENTS

| | | | |
|---|---|---|---|
| 2,645,623 | 7/1953 | Hermann .......................... | 260/46 X |
| 3,403,721 | 10/1968 | Robins et al. ................. | 260/DIG. 40 |
| 3,428,110 | 2/1969 | Walker et al. ............... | 260/DIG. 40 |

*Primary Examiner*—Lewis T. Jacobs
*Assistant Examiner*—S. M. Person
*Attorney, Agent, or Firm*—Wenderoth, Lind & Ponack

[57] ABSTRACT

Isocyanate hardenable binder compositions for use in making foundry cores and moulds are composed of an ethylenically unsaturated long chain alkyl substituted phenol or a polymer thereof and a catalyst for the hardening reaction. The catalyst is an amine and/or an organic tin compound. The composition is mixed with a polyisocyanate to form a binder system.

7 Claims, No Drawings

FOUNDRY BINDER COMPOSITIONS

The invention relates to a binder composition capable of being hardened without the application of heat and which is of particular application in the production of foundry moulds and cores.

Binders capable of hardening without the application of heat have been previously proposed for the production of cores and moulds in the foundry industry. These have included sodium silicate and various types of furane binder which have suffered from some disadvantages, e.g. poor breakdown in the case of silicate binders and intolerance towards sands containing acid neutralising impurities in the case of furane binders, and to overcome these defects organic binders hardened with a polyisocyanate have been proposed. Polyisocyanate-hardened binders proposed have included alkyd resins, blown drying oils and phenolaldehyde resins.

We have found that binders which may be hardened by polyisocyanates may be based on unsaturated long chain alkyl substituted phenols and polymers thereof, and that these have the properties desirable in a foundry core and mould binder of rapid hardening at room temperature combined with an adequate working life, absence of objectionable odour, and the ability to develop adequate bond strength at relatively low ratios of binder to aggregate which in turn results in cost economy and a low level of gas evolution during the casting process.

In accordance with the present invention there is provided a polyisocyanate hardenable binder composition comprising (A) at least one ethylenically unsaturated long chain alkyl substituted phenol or a polymer thereof and, optionally, a solvent therefor and (B) a catalyst for the hardening reaction comprising an amine and/or an organic tin compound.

The invention also provides a modification of the above composition in which (A) is a mixture of a major proportion of said substituted phenol and a minor proportion of a different hydroxy compound containing at least two hydroxyl groups per molecule and having an equivalent weight with respect to its hydroxyl functionality of not more than 300, preferably not more than 200.

The binder compositions of this invention may comprise from 60 to 100 parts, and preferably from 70 to 100 parts of said phenol or polymer of said phenol containing mixture and from 0 to 40 parts, preferably 0 to 30 parts by weight of a compatible solvent therefor and for each 100 parts of (A) 1 to 10 parts by weight, preferably from 1 to 5 parts by weight of at least one primary, and tertiary alkylamines, alkyl polyamines, mono-, di-, and tri-alkanolamines, and alkyl alkanol amines, primary arylamines and heterocyclic amines, together with between 0 and 1 part by weight preferably between 0 and 0.7 parts by weight of an organic tin compound. Alternatively the amine may be omitted and the catalyst may consist of between 0.1 and 2.0 parts by weight, per 100 parts by weight of (A) and of said organic tin compound.

We prefer to use cashew nutshell liquid as the source of the ethylenically unsaturated long chain alkyl substituted phenol.

By cashew nutshell liquid we mean the liquid phenolic extract obtainable from the shell of the cashew nut. The chemical composition of this extract will depend to some extent upon the conditions of extraction but it is generally regarded as consisting of a mixture of the unsaturated meta-substituted phenol, anacardol $C_6H_4(OH) C_{15}H_{27}$ and similar meta-substituted phenols of greater and lesser unsaturation in the alkenyl chain, together with a minor proportion of the alkenyl substituted dihydroxy benzene, cardol $C_6H_3(OH)_2 C_{15}H_{27}$.

Suitable hydroxyl compounds which may be employed as a minor constituent in the phenol-containing mixtures include polyether polyols.

The solvent may be any solvents compatible with the substituted phenol or polymer except those solvents which contain a single functional group per molecule reactive to the isocyanate radical. Examples of suitable solvents are the aliphatic and cyclic ketones, aliphatic, aromatic and cyclic hydrocarbons, ethers and esters. The solvent is used to reduce the viscosity of the binder such that it can be readily mulled with the foundry sand. Preferably the viscosity of the non-hardened binder composition is not more than 30 poises.

The catalyst is an amine and/or an organic tin compound. Organic tin salts are preferred and an example of such a tin salt is dibutyl tin dilaurate.

If the cashew nutshell liquid or cashew nutshell liquid polymer comprises 85 percent or more of the total hydroxyl containing material of part (A) we prefer to use a polymer of such degree of polymerisation that its viscosity at 20°C is not less than 40 poise, more preferably not less than 100 poise. The upper limit to the degree of polymerisation is not critical, but for convenience of handling during the preparation of the composition we prefer that it should not be greater than that giving a polymer of about 1,000 poise at 20°C.

The hardener used with the composition of the invention is an organic isocyanate or mixture of isocyanates, containing two or more isocyanate groups per molecule. Preferred on grounds of low toxicity is 4,4'-diphenylmethane diisocyanate.

The ratio of binder to isocyanate hardener may be between 2:1 and 1:1.5, preferably between 1.5:1 and 1:1.25 by weight.

The total amount of binder and hardener used will depend upon the nature of the aggregate to be bonded, and in particular upon its particle size, and the strength of bond required but will usually be between 1 and 2 percent of the weight of the aggregate.

In an alternative embodiment of the invention we propose to contact the binder mixture with all or part of the catalyst after ramming the mixture of binder, polyisocyanate hardener and aggregate into a mould or corebox of the desired shape, thereby extending the working life of the mixture without a corresponding increase in the hardening time. In this form of the invention we add to 100 parts by weight of (A) between 0 and 0.3 parts by weight, preferably between 0 and 0.2 parts by weight, of organic tin salts catalyst.

After shaping the mixture of binder, polyisocyanate hardener, and aggregate its hardening may be accelerated by contacting it with an amine catalyst as previously defined. This may be conveniently accomplished by passing the amine in the form of a gas, if a normally gaseous amine is used, or as a vapour, in the case of a normally liquid amine, through the core in the presence of an inert gas, e.g. air or nitrogen, which acts as a diluent and carrier.

By varying the amount and nature of the catalyst, the bench life of the binder composition can range from 5

EXAMPLE 1

4,400 Parts by weight of cashew nutshell liquid and 22 parts by weight of 98 percent sulphuric acid mixed with 22 parts by weight of 74 O.P. Industrial Methylated Spirit were heated to 300°C and held at a temperature between 300°C and 315°C for 2½ hours; the resultant polymer was cooled to room temperature and had a viscosity at 20°C of 880 poise.

75 Parts by weight of the above polymer were mixed with 25 parts by weight of cyclohexanone and to this mixture were added 2.18 parts by weight of triethylamine and 0.513 parts by weight of dibutyl tin dilaurate. The polymer solution had a viscosity of 12.7 poise at 20°C.

22½ Gms. of 4,4'-diphenylmethane diisocyanate were mulled for 2 minutes with 3,000 gms. of Windsor Rose sand. 22½ Gms. of the above polymer solution were then added and the mixture mulled for a further 2 minutes. 2 × 2 A.F.S. Compression Test pieces were prepared from this sand mix and tested at intervals for compression strength. The sand mix had a working life of 14 minutes. The cores were capable of being handled after 25 minutes and had a compression strength of 50 p.s.i. after 30 minutes, 420 p.s.i. after 2 hours and 800 p.s.i. at 24 hours.

EXAMPLE 2

63.8 Parts by weight of the polymer of Example 1 were mixed with 21.2 parts by weight of Caradol E102 and 14.0 parts by weight of cyclohexanone (Caradol E102 is the trade name of the Shell Chemical Co. for a polyether polyol having a hydroxyl value of approximately 280 mgm KOH/gm). To this mixture were added 1.83 parts by weight of triethylamine and 0.155 parts by weight of dibutyl tin dilaurate.

5,000 Gms. of Chelford 60 sand were mulled for 2 minutes with 37½ gms. of 4,4'-diphenylmethane diisocyanate, 37½ gms. of the above composition were then added to the mixture and mulled for a further 2 minutes. The sand mixture was rammed into an approximately cylindrical mould having a diameter of 7 inches and a depth of 4 inches. The sand mix had hardened sufficiently for the core to be stripped within 9 minutes and could be handled without distortion after 30 minutes. The core had a scratch hardness of 85 after 50 minutes.

In a separate experiment 3,000 gms. of Chelford 60 sand were mulled with 22½ gms. of 4,4'-diphenylmethane diisocyanate and 22½ gms. of the above binder. The same mixture was found to have a working life of between 5 and 6 minutes. 2 × 2 A.F.S. compression cores were prepared and found to have a compression strength of 540 p.s.i. after 2 hours, 720 p.s.i. after 3 hours and 1,050 p.s.i. after 72 hours.

EXAMPLE 3

50 lbs. of Chelford 60 sand were mulled with 150 gms. of 4,4'-diphenylmethane diisocyanate and 150 gms. of the binder of Example 2. The mixed sand was estimated to have a working life of 6 minutes and was rammed into a corebox to produce a component core for an electric motor stator. The core was stripped without damage in 10 minutes and could be handled in 40 minutes. The casting produced with this core was satisfactory and showed no pinholing or finning.

EXAMPLE 4

75 Parts by weight of unpolymerised cashew nutshell liquid were mixed with 25 parts by weight of Caradol E102 and to this mixture were added 2.14 parts by weight of triethylamine and 0.183 parts by weight of dibutyl tin dilaurate. The mixture had a viscosity of 12.8 poise at 20°C.

3,000 Gms. of Windsor Rose sand were mulled with 30 gms. of 4,4'-diphenylmethane diisocyanate and 30 gms. of the above binder. 2 × 2 A.F.S. Compression Test pieces were prepared from the mixed sand. These were found to have a compression strength of 500 p.s.i. after 3 hours hardening and 1,000 p.s.i. within 24 hours.

EXAMPLE 5

75 Parts by weight of the polymer of Example 1 were mixed with 25 parts by weight of cyclohexanone and 0.1 part by weight of dibutyl tin dilaurate.

3,000 Gms. of Windsor Rose sand were mulled with 22½ gms. of 4,4'-diphenylmethane diisocyanate and 22½ gms. of the above binder. The mixed sand had a working life of approximately 70 minutes and a 2 × 2 A.F.S. Compression Test piece made from the freshly mixed sand had attained a compression strength of only 13.5 p.s.i. after 2 hours.

Further 2 × 2 A.F.S. Compression Test pieces were made in a corebox having a perforated base by means of which a gas stream could be passed through the core. Immediately after ramming the test pieces, nitrogen, at a pressure of approximately 10 p.s.i., which had been passed across the surface of liquid triethylamine was passed through them for 30 seconds and the cores were then removed from the corebox. Immediately after removal from the corebox the cores had a compression strength of 110 p.s.i.; this had risen to 430 p.s.i. after 15 minutes and had reach 720 p.s.i. after 2 hours.

We claim:

1. In a method of forming a foundry sand mould or core by mixing with sand an effective amount of an organic binder and a polyisocyanate as a hardening agent therefor, the improvement which consists in using as the polyisocyanate hardenable binder at least one liquid ethylenically unsaturated, long-chain-alkyl substituted phenol extracted from the shell of the cashew nut or polymer thereof, by mixing with the sand:
   A. 60 to 100 parts by weight of said at least one ethylenically unsaturated long-chain-alkyl substituted phenol or polymer thereof, 0.04 parts by weight of a compatible solvent for said substituted phenol or polymer, and, for each 100 parts by weight of A,
   B. from 50 to 100 parts by weight of an organic polyisocyanate,
   C. 1 to 10 parts by weight of an amine selected from the group consisting of primary and tertiary alkylamines, alkylpolyamines, mono-, di- and trialkanolamines and alkyl-alkanolamines, primary arylamines and heterocyclic amines, and 0 to 0.7 parts by weight of an organic tin compound, the total amount of components (A), (B) and (C) being from 1 to 2 parts per 100 by weight of the sand.

2. A method according to claim 1, wherein component (A) comprises a major proportion of said substituted phenol or polymer thereof and a minor proportion of a different compound containing at least two hydroxyl groups and having an equivalent weight with respect to its hydroxyl functionality of not more than 300.

3. In a method of forming a foundry sand mould or core by mixing with sand an effective amount of an organic binder and a polyisocyanate as a hardening agent therefor, the improvement which consists in using as the polyisocyanate hardenable binder at least one liquid ethylenically unsaturated, long-chain-alkyl substituted phenol, extracted from the shell of the cashew nut, or polymer thereof, by mixing with the sand:
   A. 60 to 100 parts by weight of said at least one ethylenically unsaturated long-chain-alkyl substituted phenol or polymer thereof, 0 to 40 parts by weight of a compatible solvent for said substituted phenol or polymer, and, for each 100 parts by weight of (A),
   B. from 50 to 150 parts by weight of an organic polyisocyanate, and
   C. 0.1 to 2.1 parts by weight of an organic tin compound,
      the total amount of components (A), (B) and (C) being from 1 to 2 parts per 100 parts by weight of the sand.

4. A method according to claim 3, wherein the organic tin compound of component (C) is dibutyl tin dilaurate.

5. A method according to claim 3 wherein component (A) comprises a major proportion of said substituted phenol or polymer thereof and a minor proportion of a different compound containing at least two hydroxyl groups and having an equivalent weight with respect to its hydroxyl functionality of not more than 300.

6. A foundry moulding sand composition adapted for forming foundry sand moulds or cores, which composition comprises sand in admixture with:
   A. 60 to 100 parts by weight of at least one liquid, ethylenically unsaturated, long-chain-alkyl substituted phenol, extracted from the shell of the cashew nut, or polymer thereof, 0 to 40 parts by weight of a compatible solvent for said substituted phenol or polymer, and for each 100 parts by weight of (A),
   B. from 50 to 150 parts by weight of an organic polyisocyanate,
   C. 1 to 10 parts by weight of an amine selected from the group consisting of primary and tertiary alkylamines, alkylpolyamines, mono-, di- and trialkanolamines and alkyl-alkanolamines; primary arylamines and heterocyclic amines, and 0 to 0.7 parts by weight of an organic tin compound, the total amount of components (A), (B) and (C) being from 1 to 2 parts per 100 parts by weight of the sand.

7. A foundry moulding sand composition adapted for forming foundry sand moulds or cores, which composition comprises sand in admixture with:
   A. 60 to 100 parts by weight of at least one liquid, ethylenically unsaturated, long-chain-alkyl substituted phenol, extracted from the shell of the cashew nut, or polymer thereof, 0 to 40 parts by weight of a compatible solvent for said substituted phenol or polymer, and, for each 100 parts by weight of (A),
   B from 50 to 150 parts by weight of an organic polyisocyanate, and
   C. 0.1 to 2.0 parts by weight of an organic tin compound, the total amount of components (A), (B) and (C) being from 1 to 2 parts per 100 parts by weight of the sand.

* * * * *